(12) United States Patent
Wells

(10) Patent No.: US 9,410,649 B2
(45) Date of Patent: Aug. 9, 2016

(54) FLUID CONNECTOR WITH A HOSE CUTTING CLIP

(71) Applicant: Eaton Corporation, Cleveland, OH (US)

(72) Inventor: Michael P. Wells, Bowling Green, OH (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 14/719,724

(22) Filed: May 22, 2015

(65) Prior Publication Data

US 2015/0252928 A1 Sep. 10, 2015

Related U.S. Application Data

(62) Division of application No. 12/977,309, filed on Dec. 23, 2010, now Pat. No. 9,038,259.

(51) Int. Cl.
*F16L 33/00* (2006.01)
*F16L 25/01* (2006.01)
*F16L 33/01* (2006.01)
*F16L 33/207* (2006.01)

(52) U.S. Cl.
CPC .................. *F16L 25/01* (2013.01); *F16L 33/01* (2013.01); *F16L 33/2073* (2013.01); *Y10T 29/4987* (2015.01); *Y10T 29/49872* (2015.01)

(58) Field of Classification Search
CPC ....... F16L 25/01; F16L 33/2073; F16L 33/01; Y10T 29/49872
See application file for complete search history.

(56) References Cited

U.S. PATENT DOCUMENTS

| | | | | |
|---|---|---|---|---|
| 3,287,033 | A * | 11/1966 | Currie | 285/40 |
| 4,150,466 | A * | 4/1979 | Horvath | 29/417 |
| 9,038,259 | B2 * | 5/2015 | Wells | 29/450 |
| 2006/0196252 | A1 * | 9/2006 | Deckard | F16L 11/127 73/49.5 |

* cited by examiner

Primary Examiner — Ryan J Walters
(74) Attorney, Agent, or Firm — Fishman Stewart PLLC

(57) ABSTRACT

An electrically conductive hose cutting clip has at least one end tab that is shaped to provide a cutting edge for penetration of the inner layer(s) of a multiple layer fluid conveyance hose when it is clipped onto a fluid connector and the hose is installed on the fluid connector by forcing it onto the connector. The cutting action by the cutting clip provides for a relatively low resistance electrical connection between an electrically conductive layer of the hose and the fluid connector. This can be used to provide a signal path from a sensing element on or in the hose to a system electronic component.

7 Claims, 3 Drawing Sheets

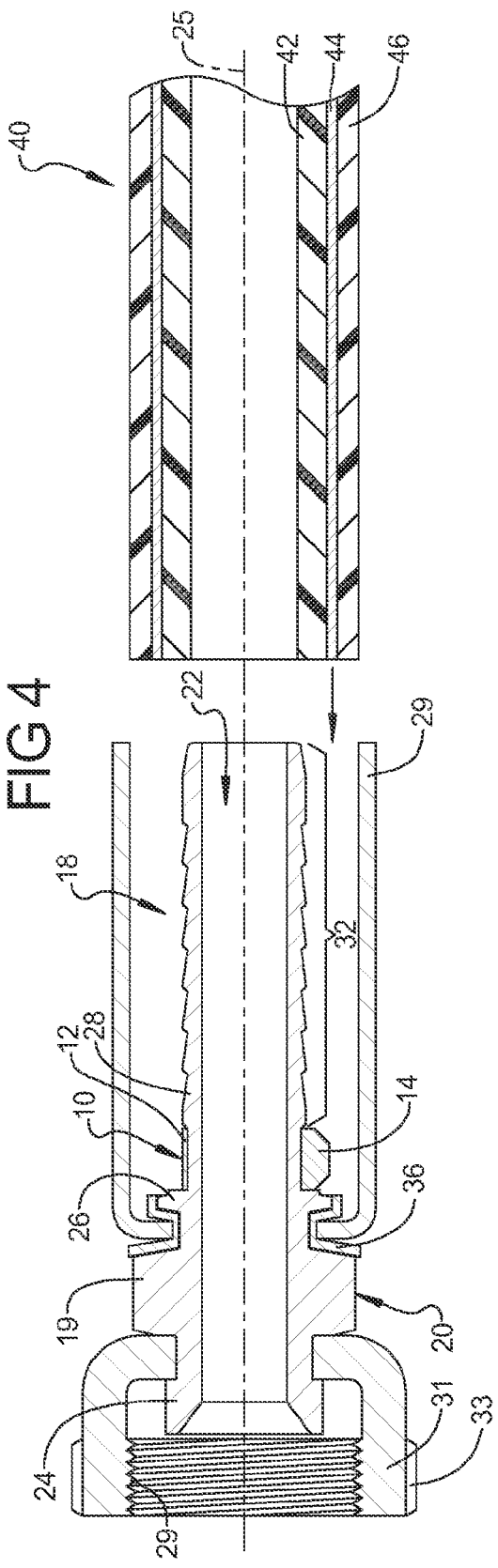
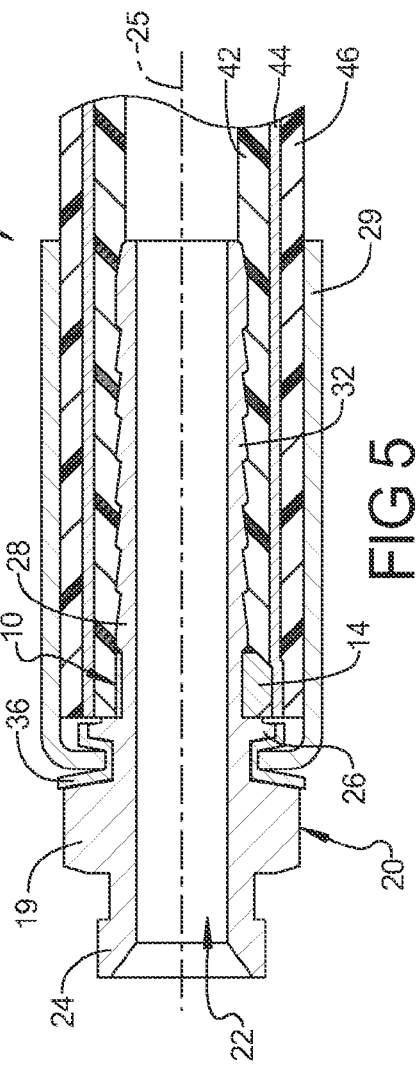

FLUID CONNECTOR WITH A HOSE CUTTING CLIP

CROSS-REFERENCE TO RELATED APPLICATIONS

This application is a Divisional Application of U.S. patent application Ser. No. 12/977,309, filed on Dec. 23, 2010, which is incorporated in its entirety. The present application relates to U.S. application Ser. No. 12/977,521 entitled Fluid Connector with a Hose Cutting Ring, and to U.S. application Ser. No. 12/977,455, now U.S. Pat. No. 8,783,732, entitled Fluid Connector with Hose Cutting Blades, both of which were filed on the same day as this application.

BACKGROUND

Traditionally, a hose that is to be connected to a system device such as a hydraulic pump is first connected to some type of hose fitting such as a fluid connector having a barbed nipple. The fluid connector is then typically connected to some type of device such as a pump or valve block using a coupling nut. As the hose is forced over the barbs on the nipple, the barbs apply a retaining force by displacing the inner layer of the hose outward without cutting that inner layer. If there is a need for an electrical connection between an electrically conductive intermediate layer such as a braided, knitted or spiral steel wire hose layer and an electronic system, then a jumper wire is required to be routed from the braided wire inner layer to the fluid connector or directly to the electronic system. These prior art electrical jumpers are unreliable and are expensive to assemble and are susceptible to damage either during assembly or during operation.

SUMMARY

The present disclosure describes a fluid connector that includes a hose cutting clip that has at least one sharp end tab that extends from a clip body. In one embodiment, the hose cutting clip has two sharp end tabs that extend from the body of the clip. This hose cutting clip provides a cutting function when a fluid conveyance hose having a pliable layer covering an electrically conductive layer is connected to onto the fluid connector where the inner layer of the hose is cut during installation so that there is an electrical path from the electrically conductive layer of the hose to the fluid connector and finally to the device to which the fluid connector is attached such as a pump or directly to an electronic circuit. The hose cutting clip of this disclosure is particularly suitable for use in conjunction with a hose that incorporates some type of sensing element in the hose and the signal generated by the sensor must be carried by the electrically conductive layer of the hose through a fluid fitting or connector to a device where it is made available for use by other control or diagnostic systems. The hose cutting clip is shown as having two sharp end tabs that extend from the clip body. This hose cutting clip provides a knife like cutting function as the hose is fully installed onto the fluid connector. The inner layer of the hose is cut by at least one of the end tabs so that there is an electrical path formed from the electrically conductive layer of the hose to the fluid connector via the cutting clip. In other words, the electrical signal can then be routed through the fluid connector to the device it is attached to or, if the connector is insulated, the signal can be directly routed to an electronic circuit such as a diagnostic or control system. The hose cutting clip of this disclosure is particularly suitable for use in a hose that incorporates some type of sensing element in the hose which generates a signal that must be carried by the conductive layer of the hose through the fluid connector to a device where it is made available for use to monitor hose life or system pressures by other control or diagnostic systems. The conductive layer of the hose is usually a steel braid, spiral wound or knitted layer although other conductive materials could be used equally as well following the teachings of this disclosure.

Also disclosed is another embodiment where a connector socket has cutting tabs extending inwardly which is used with hoses having a second conductive layer and an intermediate non-conductive layer that separates the first conductive layer from the second conductive layer. The cutting tabs cut into the outer layer of the hose and penetrate down to touch and slightly deform the second conductive layer. This completes the electrically conductive path from the second conductive layer to the socket. The socket is electrically insulated from the connector body by an insulating collar. In the case where higher fluid pressures need to be handled by the fluid connector and attached hose, then a crimped socket can be used to apply additional clamping force on the outside of the hose over a hose nipple.

BRIEF DESCRIPTION OF THE DRAWINGS

FIG. 4 is a cross-sectional view of a hose about to be installed on the fluid connector of FIG. 3; and FIG. 5 is a cross-sectional view of a hose installed on the fluid connector of FIG. 4;

DETAILED DESCRIPTION

Figure 1:
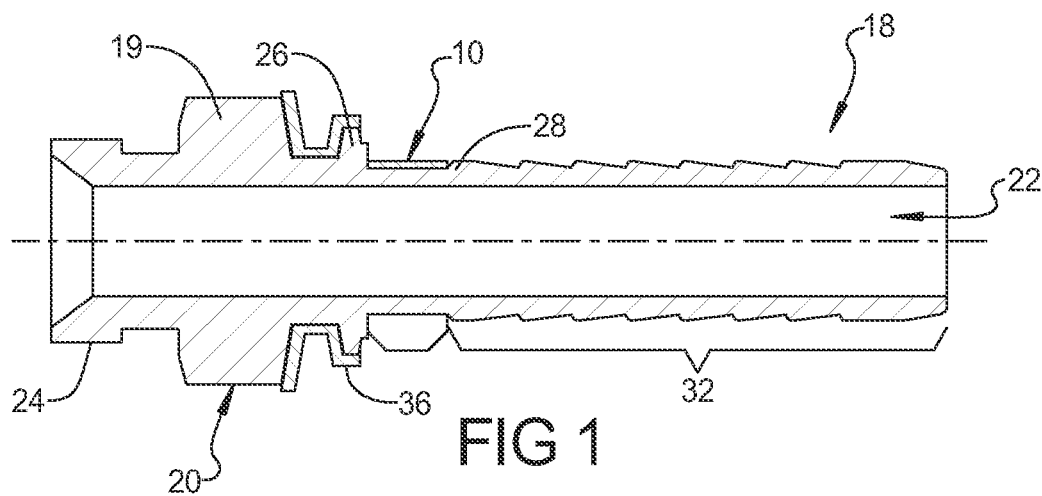
FIG. 1 is a cross-sectional view of the exemplary cutting clip mounted to a fluid connector.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Figure 2:
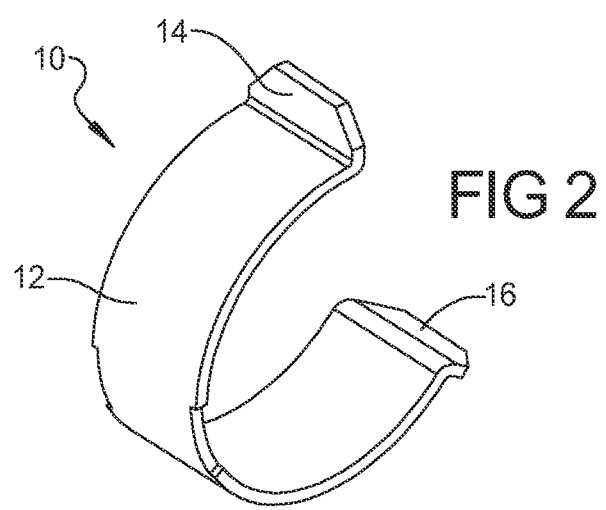
FIG. 2 is a perspective view of the exemplary cutting clip.
Figure 3:
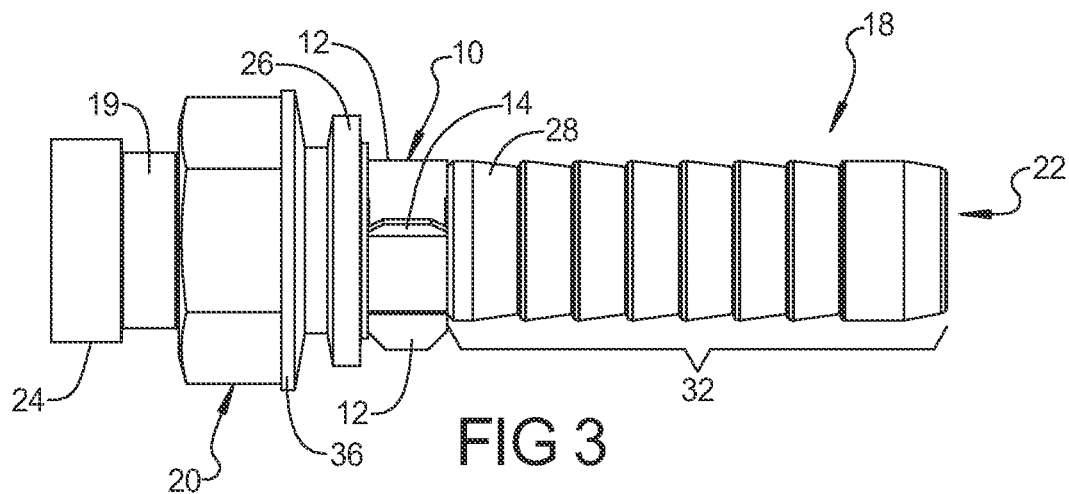
FIG. 3 is a perspective view of the exemplary cutting clip of FIG. 1.

Now referring to FIGS. 1-3 of the drawings, various views of the fluid connector 18 and the hose cutting clip 10 are shown. The exemplary hose cutting clip 10 has a clip body 12 and two relatively sharp end tabs 14 and 16 that extend outwardly from the clip body 12. The cutting clip 10 as shown in FIGS. 1-3 is installed on the body 12 of the fluid connector 18. The clip body 12 is ring shaped and is spring loaded when it is installed on the fluid connector 18 and securely engages fluid connector 18 by being expanded and then is allowed to retract over the body 12 of the fluid connector 18 as it is shown installed in FIG. 3. As will be shown and discussed with reference to FIG. 5, the hose cutting clip 10 provides a cutting function when the inner layer of a hose is cut by the end tabs 14 and 16 so that the end tabs 14 and 16 make contact with an electrically conductive layer 44 of the hose 40 and there is an electrical path established from this conductive layer 44 of the hose 40 to a fluid connector 18 and finally to the device to which the fluid connector 18 is attached such as to a hydraulic pump, motor, valve body, etc. or directly to an electronic circuit. The hose 40 cutting clip 10 of this disclosure is particularly suitable for use with a hose that incorporates some type of sensing element in the hose that generates a signal which must be carried by the conductive layer of the hose 40 through the fluid connector 18 to a electrical circuit where it is made available for use by a control or diagnostic system. A life sensing hose is one example of such a system (see FIG. 4).

The cutting clip 10 can be either clipped onto the body of the fluid connector 18 or it can be permanently attached to the body 12 or alternately, it could be formed as an integral part of the body 12 of the fluid connector 18. In that configuration, one or more of the cutting end tabs 14 and 16 would extend from the body 12 to cut the inner layer 42 of the hose 40 and electrically engage the conductive intermediate layer 44 (see FIG. 5).

The fluid connector 18 has a hex nut 20 which is connected to a mounting extension section 19 and adjacent to the chamfered section 24 which is fashioned to be engaged by a tool such as a wrench to hold the fluid connector 18 from rotating as the coupler nut 31 (see FIG. 4) is tightened. The coupler nut 31 is rotatably mounted to the mounting extension 19. A central passageway 22 formed along a central axis 25 of the fluid connector 18 provides a path to allow a pressurized fluid to flow there through. A circumferential intermediate flange 26 extends outwardly from the body of the fluid connector 18 and positions the insulating collar 36. Not shown in FIGS. 1 and 3 is the hose socket 29 which is mounted on the flange 26 with the insulating collar 36 positioned between the hose socket 29 and the flange 26 to electrically insulate the hose socket 29 from the fluid connector 18. As discussed in more detail subsequently, the insulating collar 36 is not needed if electrical isolation is not needed. The hose socket 29 is an optional part that is used for use with the handling of higher pressure fluids. It should be noted, if a socket 29 is used and no electrical insulation is required, then the insulating collar 36 can be eliminated. Also not shown in FIGS. 1 and 3 is the coupling nut 31 that is used to attach the fluid connector 18 to another fluid handling device such as a pump or valve body. The intermediate flange 26 locates the cutting clip 10 at one side of the clip body 12 while a first barb 28 serves to locate the other side of the cutting clip 10 on the clip body 12.

Now referring to FIG. 4 of the drawings, a cross-sectional view of the fluid connector 18 is shown along with a fluid conveyance hose 40 which is about to be forced onto the fluid connector 18. Attached to the coupling body 12 at the insulating collar 36 is a hose socket 29. The hose 40 is about to be installed on the barbed section 32 of the fluid connector 18. The hose 40 is shown as being made of an inner layer 42, an electrically conductive intermediate layer 44 and a wear resistant outer layer 46. It should be noted that any number of layers can be used to make up an inner layer 42 and an intermediate conductive layer 44 and the outer layer 46 can be used to make up the hose. The inner layer 42 can be made of a PTFE or other chemically impervious material while the intermediate layer 44 is usually a braided wire, although other electrically conductive material or configuration could be used such as a foil or carbon fiber. Then other layers can be added as required for a specific application. An important aspect of the exemplary cutting clip 10 is that the end tab(s) cut the inner layer(s) 42 of the hose 40.

The hose socket 29 is supported on the insulating collar 36 and surrounds and is crimped to the hose 40 after the hose 40 is pushed onto the hose nipple 32. The hose socket 29 is crimped onto the hose 40 to provide a clamping force on the hose 40 to force it against the nipple 32 and specifically against the barbs such as nipple barb 28. The insulating collar 36 can locate and hold a prior art type of socket 29 having a smooth inner surface. If the socket 29 is used with a hose 40 only having a single conductive layer 44, as is shown in FIG. 4 of the drawings then, if it is desired to have electrical conduction between the hose conductive layer and the socket, then the outer layer 46 of hose 40 can be skived off so that the inner surface of the socket 29 makes contact with the conductive layer 44 of the hose 40.

A coupling nut 31 is rotatably held to the body section 12 of the coupling 20 at a circumferential section 15 which is located between the hex nut 20 and the mating section 24. The coupling nut 31 is internally threaded at threads 29 which mate with threads formed in some type of hydraulic device such as a pump.

A chamfered section 24 is formed to engage a mating element formed in a hydraulic device such as a pump body to provide a sealed path for the fluid. The coupling nut 31 is threaded on the internal face of the coupling nut 31. The threads 29 engage mating threads formed in the pump body or other hydraulic device where the coupling nut 31 can be rotated and tightened to the hydraulic device by hex section 33 to draw the chamfered section 24 into the mating element of the hydraulic device.

The hose 40 is retained on the fluid connector 18 by at least one barb such as first barb 28 or by a multiplicity of hose barbs donated in FIG. 2 as barbed nipple 32. The barbed section 32 of the fluid connector 18 makes up what is known in the art as the nipple of the fluid connector 18. The hose 40 is shown as having three layers; a protective outer layer 46, an electrically conductive layer 44 and an inner layer 42 which is made of a material that is impervious to the fluid being handled. The hose 40 is forced onto the fluid coupling 10 over the barbs 28 on the hose nipple 32 then over the end tabs 14, 16. At that time, the end tabs 14, 16 cut into the inner layer 42 and make electrical contact with the conductive layer 44.

Now referring to FIG. 5 of the drawings, a cross-sectional view of the fluid connector 18 with the cutting clip 10 and the installed hose 40 is shown. The exemplary cutting clip 10 has a clip body 12 and two relatively sharp end tabs 14 and 16 that extend outwardly from the clip body 12. The cutting clip 10 is installed on the body 12 of the fluid connector 18. The clip body 12 is spring loaded and securely engages the fluid connector 18 by being expanded and then contracting over the body 12 of the fluid connector 18. The hose cutting clip 10 provides a cutting function as the hose 40 is pushed onto the barbed section 32 and against the flange 26 where the inner layer 42 of the hose 40 is cut by the end tabs 14 and 16 so that the end tabs 14 and 16 touch the electrically conductive layer 44 of the hose 40 and there is an electrical path established from this inner conductive layer of the hose to the fluid connector 18 and ultimately to an electrical circuit. The fluid connector is mounted to a fluidic device to which the fluid connector 18 is mechanically and sometimes electrically attached. to the device to which the fluid connector 18 is attached such as to a hydraulic pump, motor, valve body, etc. and then to an electronic circuit. The hose cutting clip 10 of this disclosure is particularly suitable for use in a hose that incorporates some type of sensing element in the hose 40 which generates a signal of which must be carried by the hose 40 through the fluid connector 18 to a electronic device where it is made available for use by a control or diagnostic system for a life sensing hose system (not shown).

The fluid connector 18 has a hex nut 20 which is fashioned to be engaged by a tightening tool such as a wrench. A central passageway 22 formed along a central axis of the fluid connector 18 provides a path to allow a pressurized fluid to flow there through. A circumferential intermediate flange 26 extends outwardly from the body of the fluid connector 18 and helps to position the insulating collar 36. The intermediate flange 26 locates the cutting clip 10 at one side of the clip body 12 while a first barb 28 serves to locate the other side of the cutting clip 10 on the clip body 12. A chamfered section 24 is formed to engage a mating chamfer formed in a hydraulic device such as a pump body. The hose 40 is retained on the fluid connector 18 by at least one barb such as first barb 28 or by a multiplicity of hose barbs donated as barbed section 32. The barbed section 32 of the fluid connector 18 makes up what is known as the nipple of the fluid connector 18.

The exemplary cutting clip 10 has a clip body 12 and two relatively sharp end tabs 14 and 16 that extend outwardly from the clip body 12. The cutting clip 10 is installed on the body of a fluid connector 18 through an inherent spring action built into the clip body 12. The clip body 12 is spring loaded and securely engages the fluid connector 18 by being expanded and then contracts over the body 12 of the fluid connector 18. The hose cutting clip 10 provides a cutting function as the hose is pushed onto the barbed section 32 and against the flange 26 where the inner layer of the hose 40 is cut by the end tabs 14 and 16 so that the end tabs 14 and 16 make electrical contact with the electrically conductive layer 44 of the hose 40 and there is an electrical path established from this conductive layer 44 of the hose 40 to a fluid connector 18. The hose cutting clip 10 of this disclosure is particularly suitable for use in a hose that incorporates some type of sensing element in the hose which generates an electrical signal which must be carried by the hose conductive layer to the fluid connector and to an electronic circuit or to a hydraulic device such as a pump or valve body where it is then made available for use by a control or diagnostic system.

The fluid connector 18 has a hex nut 20 which is fashioned to be engaged by and held by a tightening tool such as a wrench. A central passageway 22 formed along a central axis 25 of the fluid connector 18 provides a flow path to allow a pressurized fluid to flow there through. A circumferential intermediate flange 26 extends outwardly from the body of the fluid connector 18 and helps to position the insulating collar 36. The intermediate flange 26 locates the cutting clip 10 at one side of the clip body 12 while a first barb 28 serves to locate the other side of the cutting clip 10 on the clip body 12. A chamfer section 24 is formed to engage a mating chamfered surface formed in a hydraulic device such as a pump body.

The hose 40 is shown as being made of an inner layer 42, an electrically conductive intermediate layer 44 and a wear resistant outer layer 46. It should be noted that any number of layers beyond an inner layer 42 and an intermediate conductive layer 44 can be used for the hose. The inner layer 42 can be made of a PTFE or other chemically impervious material and can consist of more than one layer while the intermediate layer 44 is usually a braided or spiral or knitted steel wire although other electrically conductive material or configuration could be used such as a foil or carbon fiber. Then other hose layers can be added as required for a specific application.

If the hose 40 has at least a first conductive layer and it is desired to make an electrical connection between the conductive layer and the hose socket, then the outer layer of the hose can be skived to the conductive layer so that the socket having a smooth inner surface can contact the conductive layer when it is crimped to the hose. This configuration would create an electrical path from the conductive layer in the hose to the hose socket. This electrical signal could then be used by a variety of electrical circuits. Any combination of the hoses 40, 50 and the hose sockets 29, 59 could be used to conduct the electric signals carried by one or more conductive layers 44, 54, 58 of the hose 40, 50.

If the hose has a first conductive layer and a second conductive layer, then the first conductive layer can be electrically connected to the cutting tabs of the cutting clip and the second conductive layer can be electrically connected to the socket using the socket tabs or by skiving the hose outer layer to expose it to the socket when it is crimped.

Figure 6:
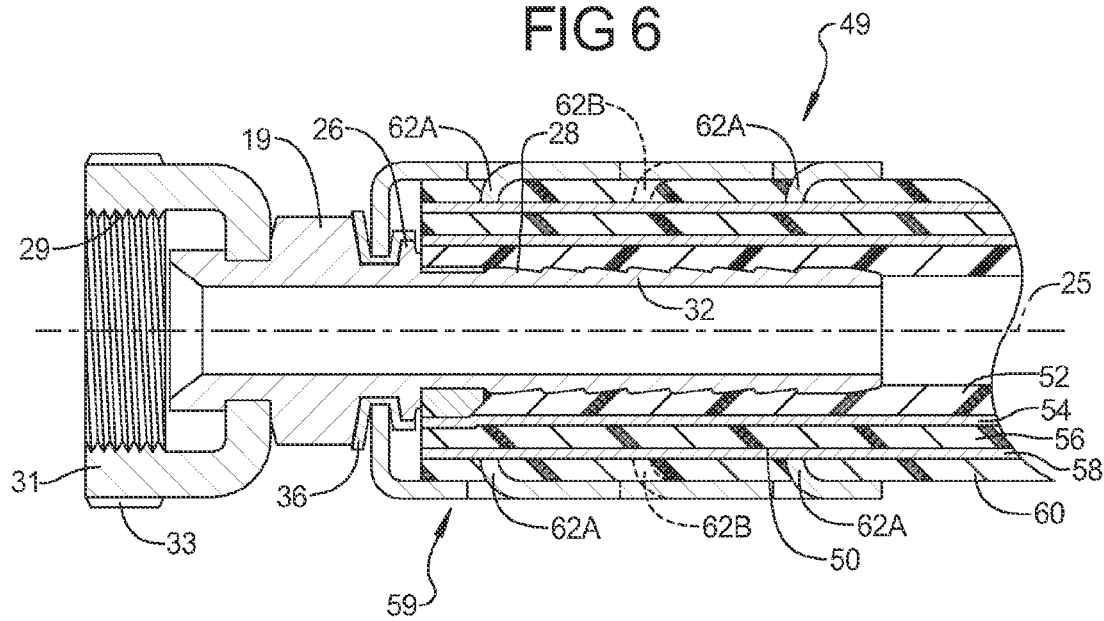
FIG. 6 is a cross-sectional view of an alternate embodiment of an exemplary fluid connector with a multi-layer hose installed.

Now referring to FIG. 6, a cross-section of a multilayer hose 50 having two conductive layers fully installed on the exemplary fluid connector 18 to make up the fluid connector assembly 49 is shown. The hose 50 has an inner layer 52, a first conductive layer 54, an intermediate layer 56, a second conductive layer 58 and an outer protective layer 60. It should be noted that any number of hose layers could be utilized to get the desired hose characteristics.

A hose socket 59 is retained on the insulating collar 36 and extends to partially cover the hose 50 after it is assembled to the hose coupling 18. The hose socket 59 is then crimped to a precise crush load on the hose. If it is desired to make electrical contact with the second conductive layer, then cutting tabs 62A, 62B are formed on the inside wall of the hose socket 59 using machine or a punch operation where it covers the hose 50. When the socket 59 is crimped to the hose 50, the tabs cut the protective outer layer 60 of the hose 50 and extend to make contact with the second conductive layer 58.

Prior to crimping the socket 59, the cutting tabs 62A, 62B extend to touch but not cut into the outer layer 60 of the hose 50. After the socket 59 is crimped, the cutting tabs 62A and 62B cut through the outer layer 60 of the hose 50 to touch and press against the outer conductive layer 58. The tabs 62A and 62B can be formed by punching the outside of the socket 59 so that the tabs 62A and 62B extend inward. The socket 59 is electrically insulated from the connector body 12 by the insulating collar 36.

To electrically connect the inner conductive layer 54 to the connector body 18 the cutting clip 10 of FIG. 2 and the exemplary hose socket 59 can be used as previously discussed. That combination could be used to provide two separate electrical signals to a diagnostic or control system. Any combination of the cutting clip 10 and the alternate socket 59 having the cutting tabs 62A, 62B or the prior art socket 29 with a skived hose could be used to provide electrical signals from a hose such as a life sensing hose to a diagnostic device or other electronic circuitry.

Figure 7:
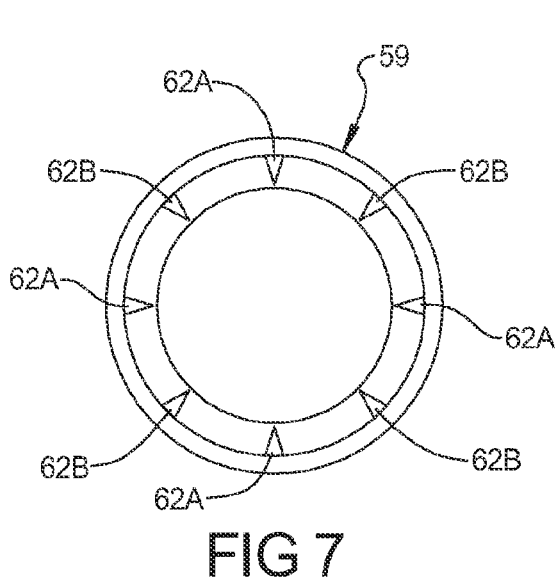
FIG. 7 is an end plan view of an alternate embodiment of the socket shown in the alternate embodiment fluid connector of FIG. 6.

Now referring to FIG. 7 of the drawings, an end plan view of the hose socket 59 of FIG. 6 is shown. The cutting tabs 62A and 62B extend inwardly a sufficient distance to pierce the outer layer 60 of the hose 50 when the socket 59 is crimped as shown. The cutting tabs 62A, 62B can be square like shaped or they can be pointed so long as they pierce the outer layer 60 of the hose 50 when the socket 59 is crimped. Since the cutting tabs 62A, 62B can be punched from the wall of the socket 59 a wide variety of shapes could be used to function as required.

Figure 8:
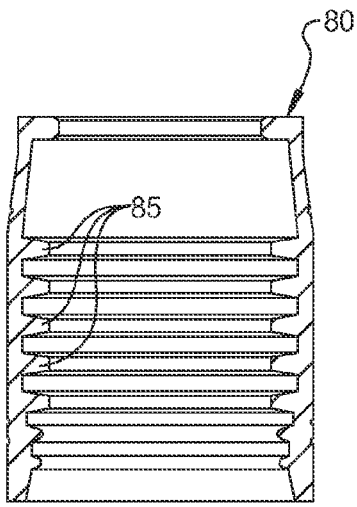
FIG. 8 is a cross-sectional view of a second alternate embodiment of a socket.

Now referring to FIG. 8 of the drawings, a cross-sectional view of a second alternate embodiment of a high pressure socket 80 is shown. The socket 80 is a heavy duty design for high fluid pressure applications. The circular ridges 85 cut into the outer layer 60 of the hose 50 and make contact with the second conductive layer 58 of the hose 50. Thus, an electrical path is established from the second conductive layer 58 to the socket 80 which is electrically isolated from the body 19 of the fluid connector 18.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

I claim:

1. A fluid coupling, comprising: a body section defining an axis and at least one cutting end tab attached to the body section, wherein the at least one cutting end tab extends radially away from the body section to cut at least an inner layer of an installed hose and—contact a radially outer conductive layer of the hose with respect to the axis to define an electrical path between the conductive layer of the hose and the body section;

wherein the at least one cutting end tab is attached to and extends from a cutting clip, and wherein the cutting clip is attached to the body section;

wherein at least two cutting end tabs extend outwardly from the cutting clip a sufficient extent to penetrate the inner layer of the hose and contact the conductive layer to define the electrical path, wherein the at least two cutting end tabs are distributed circumferentially and aligned axially about a circumference of the body section; and wherein the cutting clip defines a circumferential gap between the at least two cutting end tabs, and wherein the cutting clip further includes a clip body extending continuously from one cutting end tab to the other cutting end tab, the clip body terminating in a circumferential direction at the at least two cutting end tabs to define the circumferential gap.

2. The fluid coupling of claim 1, wherein the cutting clip is comprised of an annular clip body that engages said body section, and wherein the clip body is arranged concentrically about the body section and radially towards the axis with respect to the hose.

3. The fluid coupling of claim 1, wherein the cutting clip includes an annular clip body, and wherein the clip body is spring loaded and selectively securable around a circumference of the body section.

4. The fluid coupling of claim 1, wherein the body section is insertable into a central fluid passage of the hose and includes at least one outwardly projecting barb configured to retain the hose, and further comprising a flange extending circumferentially around and outwardly from an intermediate region of the body section, the flange disposed axially spaced from the at least one barb, and wherein the cutting clip is arranged axially between the flange and the at least one barb on the body section.

5. The fluid coupling of claim 1, further comprising a hose socket mounted concentrically on the body section configured to apply a clamping force on the installed hose and force the hose against the body section.

6. The fluid coupling of claim 5, wherein the hose socket includes at least one cutting tab extending radially towards the body section adapted to penetrate at least an outer layer of the installed hose and contact a conductive layer disposed radially between the outer layer and the inner layer.

7. The fluid coupling of claim 5, further comprising an insulating collar disposed radially between the hose socket and the body section, and further comprising a flange extending circumferentially around and outwardly from an intermediate region along the body section, wherein the flange positions the insulating collar on the body section.

\* \* \* \* \*